(12) United States Patent
Prokop

(10) Patent No.: US 8,877,032 B2
(45) Date of Patent: Nov. 4, 2014

(54) GENERATION OF CHEMICAL REAGENTS FOR VARIOUS PROCESS FUNCTIONS UTILIZING AN AGITATED LIQUID AND ELECTRICALLY CONDUCTIVE ENVIRONMENT AND AN ELECTRO CHEMICAL CELL

(76) Inventor: Dan Prokop, Kingwood, TX (US)

( * ) Notice: Subject to any disclaimer, the term of this patent is extended or adjusted under 35 U.S.C. 154(b) by 553 days.

(21) Appl. No.: 12/915,478

(22) Filed: Oct. 29, 2010

(65) Prior Publication Data

US 2011/0100839 A1 May 5, 2011

Related U.S. Application Data

(60) Provisional application No. 61/257,334, filed on Nov. 2, 2009.

(51) Int. Cl.
*C02F 1/463* (2006.01)

(52) U.S. Cl.
CPC ....... *C02F 1/463* (2013.01); *C02F 2201/46145* (2013.01); *C02F 2201/4619* (2013.01); *C02F 2201/4615* (2013.01); *C02F 2201/4617* (2013.01)
USPC ........... 205/755; 205/756; 205/757; 205/771; 204/273; 204/275.1

(58) Field of Classification Search
USPC ........ 205/755, 756, 757, 771; 204/273, 275.1
See application file for complete search history.

(56) References Cited

U.S. PATENT DOCUMENTS

| | | | |
|---|---|---|---|
| 734,549 A | 7/1903 | Halsey | |
| 1,602,595 A | 10/1927 | Sheppard | |
| 2,744,860 A | 5/1956 | Rines | |
| 3,247,024 A | 4/1966 | Tamminen | |
| 3,943,044 A * | 3/1976 | Fenn et al. | 205/701 |
| 3,985,581 A | 10/1976 | Stachurski | |
| 4,022,678 A * | 5/1977 | Wojcik et al. | 204/273 |
| 4,032,425 A | 6/1977 | Kametani | |
| 4,061,552 A | 12/1977 | Everett | |
| 4,119,766 A | 10/1978 | Doering | |
| 4,123,341 A * | 10/1978 | Gnieser et al. | 205/743 |
| 4,147,839 A | 4/1979 | Solomon | |
| 4,204,922 A | 5/1980 | Fraser | |
| 4,521,497 A | 6/1985 | Tamminen | |
| 4,565,748 A | 1/1986 | Dahl | |
| 4,684,585 A | 8/1987 | Tamminen | |
| 4,719,156 A | 1/1988 | Niksa | |
| 4,788,111 A | 11/1988 | Niksa | |
| 4,910,102 A | 3/1990 | Rao et al. | |
| 5,198,083 A | 3/1993 | Thornton | |
| 5,558,947 A | 9/1996 | Robison | |
| 5,882,502 A | 3/1999 | Gomez | |
| 6,086,832 A | 7/2000 | Ohta | |
| 6,404,076 B1 | 6/2002 | Matsuda | |
| 6,585,882 B1 | 7/2003 | Su | |
| 6,719,817 B1 | 4/2004 | Marin | |
| 7,682,492 B2 * | 3/2010 | Bradley | 204/230.2 |
| 2004/0067410 A1 | 4/2004 | Jones | |
| 2009/0239131 A1 | 9/2009 | Winter | |
| 2010/0009243 A1 | 1/2010 | Winter | |

* cited by examiner

*Primary Examiner* — Arun S Phasge

(74) *Attorney, Agent, or Firm* — David McEwing

(57) ABSTRACT

The disclosure teaches an apparatus for circulating electrically conductive solutions between electro-chemical cells. The apparatus is able to decrease the size or surface area of the cells and operate the electro-chemical at reduced amperage. Movement of the solution over the plates also facilitates reduced build up of scale on the plates. The flow rate or treatment dwell time can be controlled.

20 Claims, 3 Drawing Sheets

TOP VIEW OF DRAFT TUBE AND REACTOR VESSEL

SIDE VIEW OF DRAFT TUBE AND REACTOR VESSEL

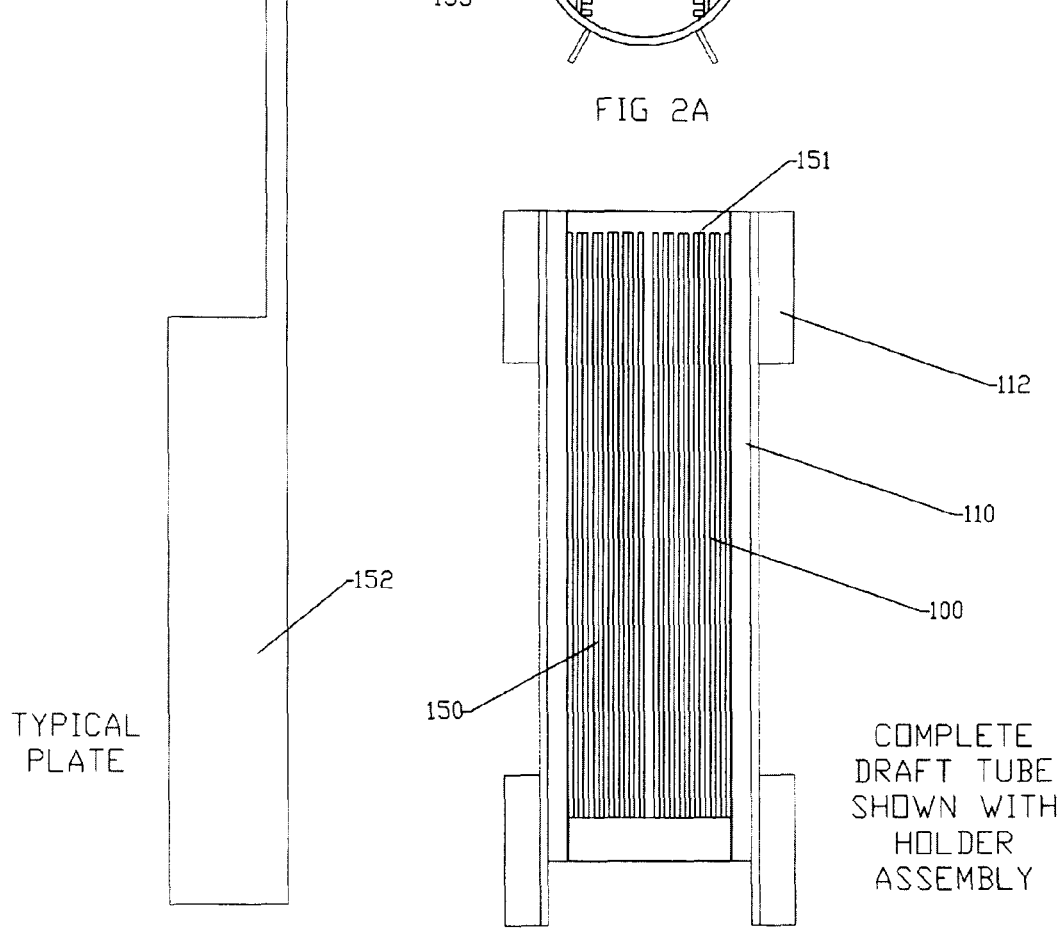

TOP VIEW OF DRAFT
TUBE AND REACTOR
VESSEL W/ PLATES

SIDE VIEW OF DRAFT
TUBE AND REACTOR
VESSEL W/ PLATES

GENERATION OF CHEMICAL REAGENTS FOR VARIOUS PROCESS FUNCTIONS UTILIZING AN AGITATED LIQUID AND ELECTRICALLY CONDUCTIVE ENVIRONMENT AND AN ELECTRO CHEMICAL CELL

RELATED APPLICATION

This application claims priority to and incorporates by reference herein provisional application Ser. No. 61/257,334 entitled "Generation of Chemical Reagents for Various Process Functions Utilizing an Agitated Liquid and Electrically Conductive Environment and an Electro Chemical Cell" filed Nov. 2, 2009.

BACKGROUND TO DISCLOSURE

Many process streams exist that require advanced chemical treatment. These streams range from potable drinking water to industrial process streams. These industrial process streams contain a multitude of soluble compounds that require treatment by some process. This can include pretreatment before discharge into a publically owned treatment works (POTW). The soluble compounds include but are not limited to arsenic, nitrates, organics, compounds in potable water as well as a list of a multitude of compounds dissolved in industrial process waters. These contaminants and the variety of contaminants make the process streams difficult to treat with conventional techniques. Additionally, many process production streams require specialized equipment. A multitude of treatments and process systems have been designed to treat the various streams described above. These range from conventional chemical treatment processes to ion exchange to electro coagulation devices. These processes have been implemented in various streams with varying degrees of success. All processes additionally have inherent limitations.

The process that most closely resembles the disclosure described herein is a conventional electro-coagulation (EC) process. Conventional electro-coagulation is a physiochemical process that is produced by passing an electrical current through metallic plates immersed in an electrically conductive solution. The apparatus performing this process is termed an "EC apparatus." This process has been described in multiple versions for more than 75 years. In conventional electro-coagulation, solutions are passed over plates of various metallic compounds. The metallic plates are energized by direct current (DC) voltage producing an electrified solution. It is implied herein that the solutions must be conductive. The voltage creates many physiochemical phenomena in the fluid passed between the plates. These range from strong magnetic forces, high reduction potentials (by the formation of radicals), ionized metal compounds and ionized hydroxide ions.

The manifestation of the electro-coagulation process is the formation of chemically generated floc that are produced from the metallic ions acting on the impurities (termed "particles" herein) in the solutions. Coagulation is brought about primarily by the reduction of the net surface charge to a point where the colloidal particles (impurities), previously stabilized by electrostatic repulsion, can approach closely enough for van der Waals forces to hold them together and allow aggregation. It has been described that the physiochemical reactions of the electro-coagulation process occur at the surface of the electrical plate. The floc provides a mechanism to bind to particles and allow the material to be removed from solution in the form of a solid or precipitant.

In all the previous versions of the electro-coagulation process, solutions are passed in a base laminar flow pattern over the electrical plates. In these variations, it is desired that the process steam have a defined contact time with the surface of the electrolytic cell, allowing the formation of the precipitant at the surface of the electrolytic cell. This requires that the cell has adequate surface area in order that the reaction can run to completion. All previous versions of the implementation of an electrical cell for process purposes described herein has relied on the flow patterns generated by the flow of a fluid over a cell of various configurations (inclined plates, liner plates, plates suspended in frames, etc). The previous implementations have many limitations. The criticality of surface contact has necessitated detailed fabrication requirements, size requirements, and spacing tolerances of the electrolytic cell, with resulting high scaling potentials on the surface of the plates, high heat generation, large surface area and large electrical loading.

SUMMARY OF DISCLOSURE

What is disclosed is an agitated electro chemical reagent reactor apparatus and method for treating contaminated liquids with high levels of suspended, colloidal and dissolved solids. The process additionally provides for the reduction or elimination of emulsified materials. The source of this liquid, e.g., process water, can vary and may contain a vast array of contaminates. In one example, water from pressure washing operations is no longer permitted to be disposed onto the land or down storm sewers. Currently, the water must be collected and trucked to treatment sites. A treatment fee is assessed.

The process water is pumped (or gravity fed) to the agitated electrochemical reaction reactor (hereinafter "AECRR") at a controlled rate. The rate is defined by calculation and is determined based on the desired residence time in the reaction vessel. Material flows into the AECRR unit and is subjected the electrochemical conditions for the defined period of time. The material is circulated within the reactor of a defined volume for a period of time. The material can be operated on a continuous basis with a constant stream added and treated water discharged. The period of time can be controlled to permit the material to be adequately exposed to the electrochemical conditions. During this circulation period, the material passes multiple times in proximity to the charged plates. The velocity of the material circulating over the plates (cathode and anode) can be controlled to ensure adequate exposure to the electrochemical conditions. The circulation of the material away from the plates retards the build up of scale upon the electrode plates. The build up of scale inhibits the electrochemical reaction.

After appropriate duration of circulation, the material then overflows by gravity (or can be transferred by pump on level control) to an additional tank that provides ample time for the completion of the reaction and/or the coagulation(s) to occur.

In at least one embodiment, the material is allowed to sit in residence in the secondary collection tank (hereinafter "secondary tank") in a quiescent (or weakly mixed) manner. During this time, formed or de-emulsified materials either settle or rise depending on the relative density compared with the aqueous solution. Distinct phase separation occurs in the secondary tank. To facilitate continuous operation of the AECRR unit, two or more tanks must be provided downstream of the unit to provide for a quiescent zone for settling/rising/separation to occur. The amount of residence time must be determined based on the separation rates that have been observed.

In this embodiment, phase separation is facilitated by removing unique and separated phases from the quiescent tank and directing the phases to various locations. The disposition of the phases will depend on their physical characteristics. These separated materials may or may not require additional process steps prior to sending to a final disposition. For example, if the aqueous phase material is desired for recycle or disposition to a treatment plant, polishing of the trace suspended solids (TSS) may be required. Final polishing of this material with the use of a filter element would constitute an additional process step required to meet the effluent requirements.

In at least one embodiment, the material flows from the AECRR into a continuous separation device. The continuous separation device can consist of a number of commercially available phase separation devices including, but not limited to, conventional clarification, lamella plate settlers, dissolved gas/air floatation, etc. In this embodiment, the AECRR unit operates in continuous mode and the effluent enters the continuous separation device. The device must be configured in such a manner as to allow the flocculation reactions or alternate reactions to continue to completion. Mixed materials fed to the continuous separation device will then be separately based on density, solubility, etc in the manner provided by the separation equipment. The disposition and potential secondary operations required on the separated materials will vary depending on the application.

As provided in the above example of parking wash waters, the water produced from the washing operation contains high total dissolved solids (TDS), total suspended solids (TSS), oil, grease and colloidal particles. In this embodiment, the water is processed and distinct phase separation occurs. The phases containing contaminates are concentrated thereby, reducing the amount of water that must be disposed. The aqueous product is filtered and recycled for washer feed water.

SUMMARY OF DRAWINGS

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

FIG. 2A illustrates the to view of the vessel including the rack suspending the plates and one of the plates.

FIG. 2B illustrates a side view of a metal plate (either cathode or anode).

FIG. 2C illustrates one embodiment of the electrically conductive plates. Also illustrated is the rack that holds the individual plates in the draft tube.

DETAILED DESCRIPTION OF THE DISCLOSURE

Figure 1A:
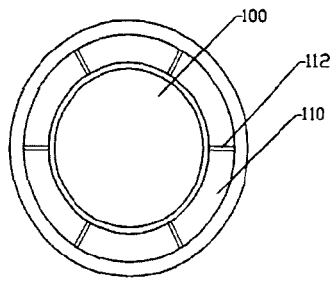
FIG. 1A illustrates a top view of the draft tube including the outer annulus and center walled section of the tube. Also shown are the baffles.

It is the intention of this disclosure to describe a method and apparatus that can be configured in various embodiments and that will have a broad range of applications. These can range from potable water, municipal waste waters, industrial process waters, industrial waste water, cleaning solutions, chemical reaction processes or by-products (industrial and medical), electrical production, hydrogen production, as well as other applications.

The limitations of the electro-coagulation process and apparatus are removed or diminished by the method and apparatus of the present disclosure. In contrast to the detailed fabrication requirements and tolerances of the prior art electrolytic cell, the present disclosure provides for simplified fabrication of the reactor vessel and plates as well as ease of insertion/removal and maintenance of the plates while in service. Fabrication is simplified and requiring less rigid tolerance due to the decreased surface area requirements of the smaller plates and extended dwell time within the vessel. In regard to the high scaling potentials, much of the electrochemical reaction occurs away from the plates, therefore there is less opportunity for the particles to foul or scale on the plate surface. High heat generation does not occur in view of the smaller surface area of the plates, diminished electrical power requirements, and high liquid flow rate over the plate surface. Also the agitated liquid disperses the heat throughout the vessel.

The electro-coagulation process utilizes electrically conductive plates with large surface areas and which require large electrical loading. This loading can be approximately 25-125 amps per gallon treated (dependent on stream conditions). This disclosure allows for multiple circulation of a waste stream across the energized plates. This recirculation creates repeat opportunities for the desired electrochemical reaction to occur. The flow of the waste stream also causes the chemical reactions to occur away from the plates. This minimizes scaling on the plate surfaces.

What is disclosed is an agitated electro chemical reagent reactor ("AECRR"). In the presented disclosure of implementation of an electrolytic cell in conductive fluid applications, the electrolytic cell is suspended in a reaction vessel containing a liquid agitator. To ensure proper flow patterns, one embodiment of the method is to suspend the electrical plates in an AECRR vessel that is configured as a draft tube 102 design vessel as shown in FIG. 1B. In this implementation, the process fluid is feed into the tube vessel 100 through the inflow 105 in the reaction chamber 111 is mixed with the flow pattern though the draft tube (center section) followed by reverse directional flow though an outer annular section 110. The outer annular section may contain baffles 112 to align the liquid flow. This method will provide for defined circulation patterns in the process vessel and will allow the fluid(s) to contact the electro-chemical cell 150 multiple times. The electro-chemical cell precipitates or coagulates particles, solutes and particles in colloid suspension (hereinafter "particles"). The AECRR vessel contains an agitator 140 with a shaft 141 and drive motor 142. The agitator comprises rotating impellers 145. Also illustrated is a liquid overflow tube 106. (The overflow tube can feed separate tanks or vessels wherein the precipitate can settle out or the floc removed from the liquid surface.) The plates 151 suspended within the draft tube 100 and comprising the electro-chemical cell are also shown.

Figure 1B:
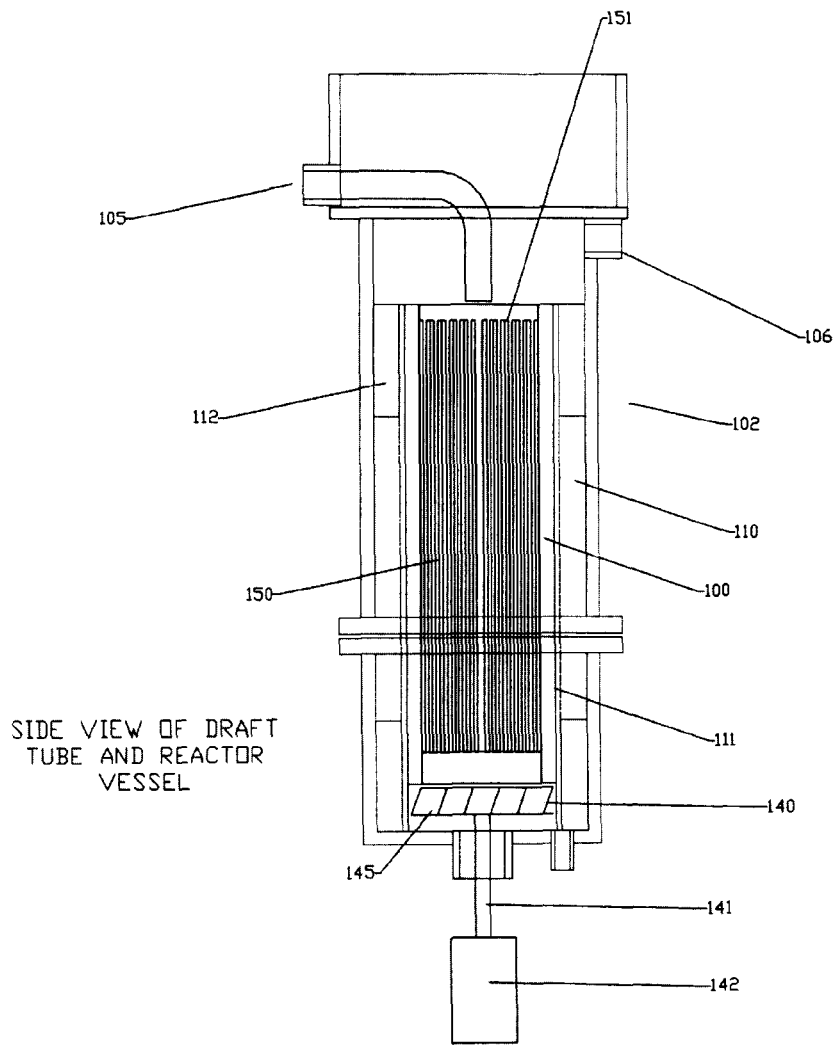
FIG. 1B illustrates an embodiment of the invention showing suspended electrical plates in a center walled section of a reaction vessel with the electrically conductive liquid flowing down between the plates through the draft tube and circulating through an outer annulus to the bottom of the vessel. This method will provide for defined circulation patterns in the process vessel and will allow the fluid(s) to contact the electrochemical cell multiple times.

FIG. 1A illustrates a top view of the AECRR vessel showing the baffles 112, the outer annular section 110 and the tube vessel 100.

FIG. 2C illustrates a side view of the AECRR vessel showing the tube vessel 100, the outer annular section 110 and the electrochemical cell 150. Also shown are the baffles 112 and individual electrically charged plates 151. FIG. 2A is a partial top view of the vessel showing the vessel tube 100, baffle 112 and charged plate 151. The charged plates are suspended in a rack 153 above the agitator impeller (not shown). FIG. 2B shows a side view of one embodiment of an electro plate 152.

Figure 3A:
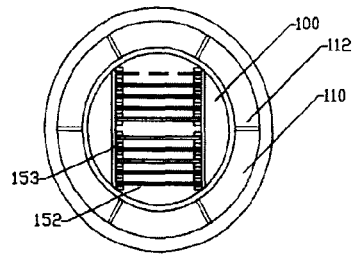
FIG. 3A illustrates another to view of the reactor vessel.
Figure 3B:
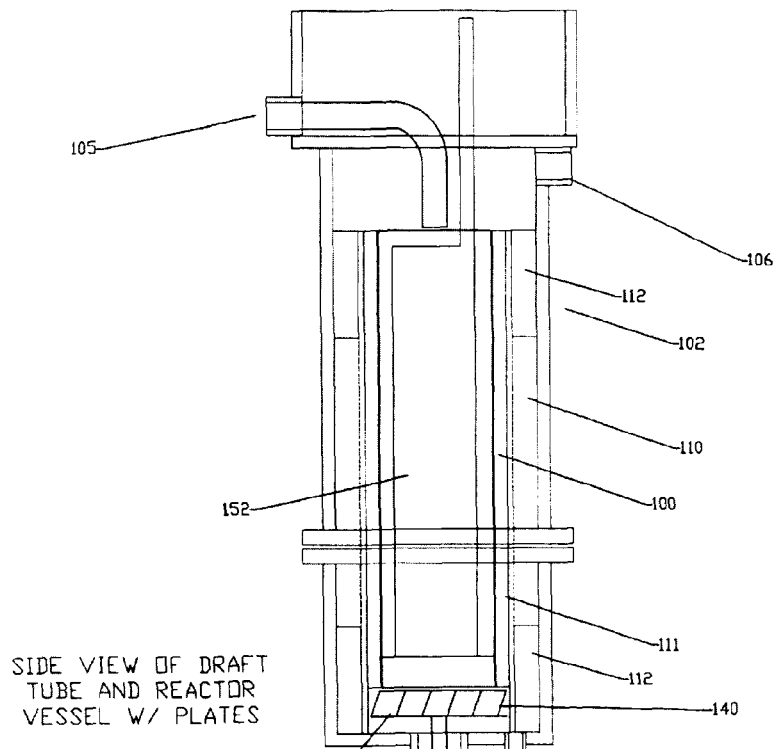
FIG. 3B illustrates a side view of one embodiment of the draft tube holding the plates.

FIG. 3B illustrates an embodiment of the disclosure showing a side view of the agitated electro chemical reagent reactor (AECRR). Illustrated is a side view of an electro plate 152. It will be appreciated that the electrical leads to the DC power source are not disclosed. The electro plate (which may be an anode or cathode) is suspended in a rack 153 as shown in FIG. 3A within the vessel tube 100. The solution may circulate up from the bottom of the tube as propelled by the rotating impellers 145 of the agitator 140. The liquid travels over the top of the vessel tube and through the baffles 112 of the draft tube 110. In another embodiment the flow of the solution may be reversed and fed from the top of the vessel from the AECRR feed 105. The excess liquid can flow out of the vessel through the liquid overflow 106.

The electrochemical cell within the vessel can treat contaminated liquid in a batch mode or as a continuous process stream.

There is no preferred direction for the flow pattern or the location of the electrochemical cell. The flow can be up through the draft tube and down through the annulus. The vessel annular space may contain baffles as shown in FIG. 1. The baffles vertically align the flow through the annular space. The electrochemical cell may be located in either (or both) zones or the flow pattern can be the reverse of the previous implementation. In addition, while a circular vessel with a circular draft tube is the preferred method as shown in FIGS. 1 and 2, the geometry of the vessel and tube could include any geometric shape (square, hexagonal, etc) and is not limited by requiring the geometric shape of the internal and external tubes to be uniform (example—square internal tube portion of the vessel and circular external vessel).

The preferred method of agitator design utilizes a bottom entry mechanical agitator. This is the preferred method, as the electrical forces that are generated in the reaction zone create magnetic forces that can impact the mixer efficiency. The reaction zone or chamber comprises the portion of the vessel occupied by the energized electrical plates. Agitator shafts manufactured from materials that are subject to magnetic forces that pass through the electrochemical cell are subjected to increased forces due to the magnetic effects of the cells. These magnetic effects create excess drag on the mixer and provide for additional power requirements for the agitation. Shafts of non-metallic or shafts made of materials which are not subject to magnetic forces can be utilized if top entry agitation is preferred or required based on the process implementation.

As stated the agitator can be located at the bottom of the vessel. The agitator may comprise a plurality of radial blades. This design propels the liquid from the draft tube into the annular space (or the opposite direction depending on the direction of the agitator). If the embodiment utilizes a draft tube located electrical cell, the annular space will contain baffles. If the alternate embodiment is practiced, the electrical cells function as the baffle. The inlet liquid feed can be in the bottom of the vessel. The vessel also includes a liquid overflow.

FIG. 1B illustrates an embodiment where the electrochemical cell is located in the draft tube. The cell comprises a plurality of vertically oriented metal plates. FIG. 2B illustrates one embodiment of the plates. Also illustrated in FIG. 2A is the rack that holds the individual plates in the draft tube. Plates can comprise iron, aluminum, copper, stainless steel, or alternate metallic compounds (or a mix of stated metals). The plates are sacrificial. Each plate is in communication with an electrical (DC) power source. The plates are not in contact with the neighboring plates. In one embodiment, the space between each plate is 0.125 times the plate width. The space can be less. Liquid can flow between each plate. The plates have alternating charges (cathode/anode).

The ions produced by the electrical current passing through the plate will be governed by the type of metal plate. For example, if the plates are alumina constituent ions of alum are formed. If the plate is iron, ferric and ferrous ions will be formed. Air or other oxidizing agents can be introduced into the reaction chamber to ensure regents are in their preferred forms. Reducing agents can also be added to the solution. Hydroxide ions will form from the water at a rate equal to the ionic valance of the cations generated.

As stated above, the suspended electrochemical cell is energized with rectified power to create an electrical power of direct current (DC). The power requirements for the electrochemical cell depend on the material processed and the results desired. Typically, a determined operational voltage is set for the electrical cell. The current requirements (amperage) vary in accord to the conductivity of the processed fluids. Fluids of lower conductivity (lower dissolved solids) require lower amperages while fluids with greater conductivity (higher dissolved solids) require higher amperages.

In this embodiment, floc formation does not occur exclusively at the plate surface of the electrochemical cell. In this embodiment, the electrical cell is utilized as a generator of physiochemical forces and reagents (metallic and hydroxide ions) and the process fluid is provided in a well mixed environment. The well mixed environment allows for rapid distribution of all chemical reagents uniformly in the process fluid. In this manner, the utilization of the reagents is more efficient. A secondary zone downstream of the reaction device is required to allow precipitant formation and finalization of the chemical reactions. In this embodiment, the potential for scale or fouling formations on the electrochemical cell is greatly reduced. Periodic reversal in the cell polarity is desired to ensure that the cell plates maintain even wear though their useful life.

It is also presented that the volume of the process fluid contained in the vessel is of significant volume to generate a defined residence time for contact with the electrical field of the electrochemical cell. The required contact time (defined as residence time) can vary on implementation (flow and size) and the requirements of the process. The residence time is the quantity of time the solution is circulating within the vessel. The residence time can vary from a few seconds of contact time to multiple hours. In one embodiment, the residence (dwell) time of liquid in the vessel can be controlled by the quantity of liquid entering the vessel. Less quantity entering results in less quantity exiting the vessel. The residence time can be controlled. In one embodiment, the flow rate within the vessel can also be controlled by controlling the speed of the agitator.

The physical design of this disclosure allows for the process fluids in the reactor (the process vessel) to be in contact with the electrical field (the total surface area of the electrical plates) of the electrochemical cell multiple times during the residence time in the reaction chamber. The process fluids contained in the reaction device are circulated at varying rates (depending on agitation speed) and are subjected to the forces generated by the electrical cell multiple times while in the reagent reactor. The residence time and electrical cell contact equivalent are easily calculated based on reaction chamber volume, feed rate and circulation rate within the chamber. In this configuration, electrical cells of much smaller surface area are utilized (as compared to conventional electro coagulation configurations) due to the multiple passes over the cells while in the reaction chamber. This provides for significantly reduced total electrical cell surface area as an effective surface area is created due to the multiple contacts in circulation. This is in contrast to the previously used electro-coagulation apparatus with the liquid typically making a single pass over of the electrical plates. Lower amperage is required for the reaction vessel subject of this invention. The configuration of this disclosure also eliminates/reduces the formation of particles on the plates (thereby reducing the potential of scale formation on the plate surface—scale formed on the plates produces an insulator from the process fluid and reduces the efficiency of the electrical cell). It also provides for a more compact treatment mechanism than possible with the prior art versions.

What I claim is:

1. An apparatus for removing particles from electrically conductive liquid comprising:
    (a) a multi chambered vessel comprising a center chamber with walls separating the center chamber from an outer annular chamber but in fluid communication between the center chamber and the outer annular chamber;
    (b) a liquid intake port into the vessel;
    (c) a liquid outlet port from the vessel;
    (d) an electrochemical cell located within a chamber of the vessel and comprising a plurality of parallel oriented alternately charged metal plates in communication with a DC electrical power source;
    (e) a fluid re-circulating path among the chambers of the vessel; and
    (f) variable speed agitator whereby an electrically conductive liquid can be controllably re-circulated among the chambers and over the charged metal plates.

2. The apparatus of claim 1 further comprising plates of the electrochemical cell being spaced approximately 0.125 times the width of each plate.

3. The apparatus of claim 1 further comprising the electrochemical cell located within the center section of the vessel.

4. The apparatus of claim 1 further comprising the electrochemical cell located in the outer annulus section of the vessel.

5. The apparatus of claim 1 further comprising positioning electrochemical cells in the outer annulus section and center section of the vessel.

6. The apparatus of claim 1 further comprising the liquid agitator placed at the bottom of the vessel.

7. The apparatus of claim 1 further comprising a secondary tank receiving the gravity overflow or pumped discharge from the vessel.

8. An apparatus comprising a vessel containing a plurality of cathodes and anodes, a center re-circulating section, an outer annulus re-circulating section separated by a wall, and controllable speed rotary agitator for re-circulating electrically conductive liquid between the cathodes and anodes for electrically coagulating particles, and a reaction space comprising center re-circulating section or outer annulus re-circulating section wherein the reaction space is positioned away from the cathodes and anodes.

9. The apparatus of claim 8 further comprising the vessel having a center section in fluid communication with an outer annular section.

10. The apparatus of claim 9 wherein the vessel contains a baffle.

11. The apparatus of claim 8 further comprising an agitator motor positioned distant from the electromagnetic field produced by the cathodes and anodes.

12. The apparatus of claim 8 further comprising the rotor shaft and blades of the agitator made of non-metallic material.

13. A method for precipitating dissolved metal ions in a liquid by the steps comprising:
    (a) placing the liquid into a vessel containing a cathode and an anode and having a center re-circulating section, an outer annulus re-circulating section separated by a wall;
    (b) powering the cathode and anode;
    (c) using a variable speed rotary agitator to control the circulation of the liquid between the cathode and anode and through the vessel;
    (d) conducting a reaction away from the surfaces of the cathode and anode; and
    (e) re-circulating the liquid to the cathode and anode and a reaction space comprising center re-circulating section or outer annulus re-circulating section.

14. The method of claim 13 further comprising controlling the dwell time of liquid between the cathode and anode.

15. The method of claim 13 further comprising controlling the velocity of liquid between the cathode and anode.

16. The method of claim 13 further comprising adding oxidizing agents to the solution.

17. The method of claim 16 wherein the oxidizing agent is air.

18. The method of claim 13 further comprising adding reducing agents to the solution.

19. The method of claim 13 further comprising discharging liquid into a second vessel for settlement of metal precipitates.

20. The method of claim 13 further comprising discharging liquid into a third vessel for separation of floc from the liquid.

* * * * *